United States Patent [19]
Gall

[11] B 3,914,245
[45] Oct. 21, 1975

[54] 4(2-PHENYL-O-TOLYL)-3,5-DISUBSTITUT-ED-4H-1,2,4,-TRIAZOLES
[75] Inventor: Martin Gall, Kalamazoo, Mich.
[73] Assignee: The Upjohn Company, Kalamazoo, Mich.
[22] Filed: Aug. 13, 1973
[21] Appl. No.: 387,761
[44] Published under the Trial Voluntary Protest Program on January 28, 1975 as document no. B 387,761.

Related U.S. Application Data
[63] Continuation-in-part of Ser. No. 172,920, Aug. 18, 1971, abandoned.

[52] U.S. Cl.... 260/308 R; 260/247.1; 260/247.2 R; 260/247.5 E; 260/293.69; 260/294.8 R; 260/294.8 E; 260/295 D; 260/295 S; 260/296 R; 260/558 H; 424/248; 424/263; 424/267; 424/269
[51] Int. Cl.² ............. C07D 249/08; C07D 265/30; C07D 211/14; C07D 207/06
[58] Field of Search....... 260/308 R, 296 R, 293.69, 260/247.5 E

[56] References Cited
OTHER PUBLICATIONS
Gall, Chemical Abstracts, Vol. 78, Abstract No. 136, 302t (1973).

Primary Examiner—Alton D. Rollins
Attorney, Agent, or Firm—Hans L. Berneis

[57] ABSTRACT
Compounds of the formula II

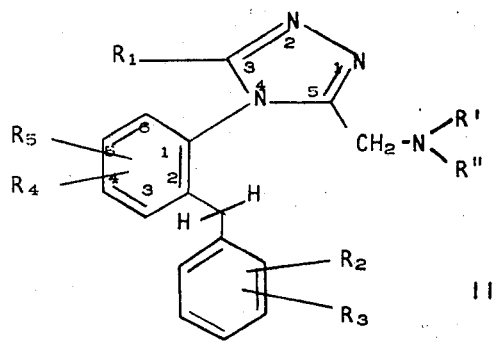

wherein $R_1$ is selected from the group consisting of hydrogen, alkyl of 1 to 3 carbon atoms, inclusive, cycloalkyl of 3 to 8 carbon atoms, inclusive, phenyl, benzyl, pyridyl; wherein $R'$ and $R''$ are alkyl defined as above, or together

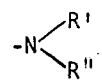

is pyrrolidino, piperidino, and morpholino; wherein $R_2$, $R_3$, $R_4$, and $R_5$ are hydrogen, alkyl as defined above, halogen, or trifluoromethyl, are produced by applying a Mannich reaction to a compound of the formula I:

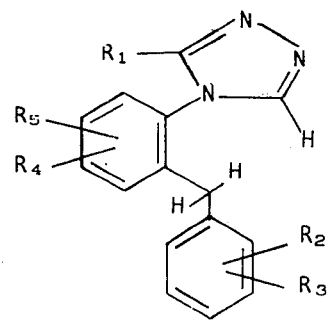

wherein $R_1$, $R_2$, $R_3$, $R_4$, and $R_5$ are defined as above. The compounds of formula II have activity per se or as pharmacologically acceptable acid addition salts as sedatives, hypnotics, anticonvulsants, tranquilizers, and muscle relaxants in mammals and birds, also as feed additives for increasing growth rate and feed efficiency of livestock and poultry. They can also be used as intermediates for other active compounds, such as the corresponding benzophenone type compounds (IV) produced from II by oxidation.

5 Claims, No Drawings

4(α-PHENYL-o-TOLYL)-3,5-DISUBSTITUTED-4H-1,2,4,-TRIAZOLES

CROSS REFERENCE TO RELATED APPLICATION

This application is a continuation-in-part of application Ser. No. 172,920 filed Aug. 18, 1971 and now abandoned.

BACKGROUND OF THE INVENTION

FIELD OF THE INVENTION

This invention is directed to new organic compounds and is particularly concerned with novel 4-[α-phenyl-o-tolyl]-3,5-disubstituted-4H-1,2,4-triazoles, processes for the production thereof, and processes for the production of substituted 2-[3-substituted-5-aminomethyl substituted-4H-1,2,4-triazol-4-yl]benzophenones. The invention also encompasses pharmacologically acceptable acid addition salts of these compounds.

The novel compounds and the processes of production therefore can be illustratively represented as follows:

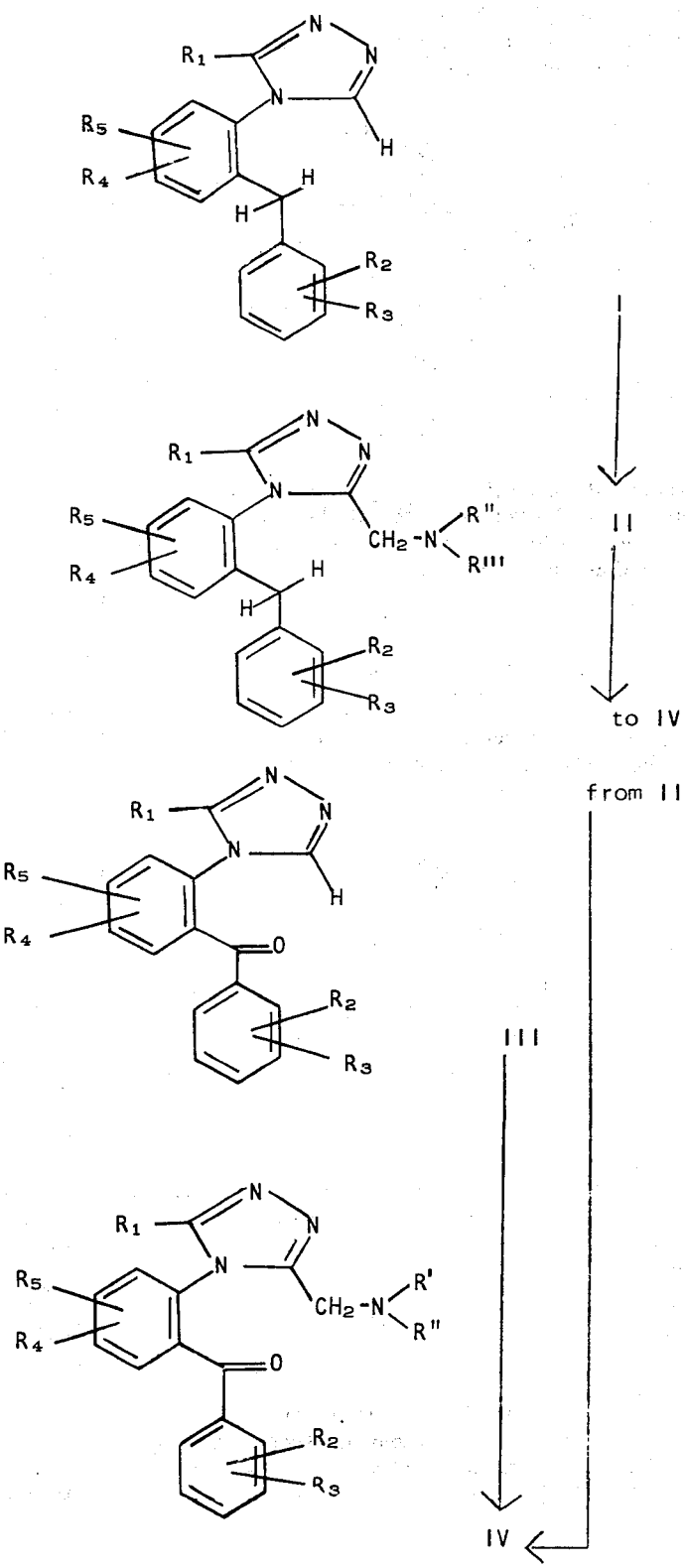

wherein R₁ is hydrogen, alkyl of 1 to 3 carbon atoms, inclusive, cycloalkyl of 3 to 8 carbon atoms, inclusive, phenyl, benzyl, and pyridyl, wherein R' and R'' are selected from the group consisting of alkyl defined as above, or together

is pyrrolidino, piperidino, morpholino; wherein R₂, R₃, R₄, and R₅ are of hydrogen, alkyl as defined above, halogen, or trifluoromethyl.

The more desirable compounds of formula II have the specific formula IIA:

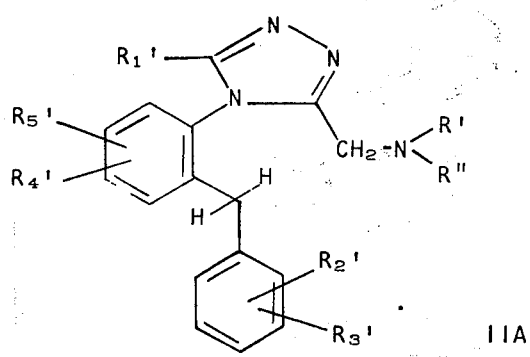

wherein R₁' is alkyl of 1 to 3 carbon atoms, inclusive and 4-pyridyl; wherein R₂', R₃', R₄', and R₅' are hydrogen, fluoro, chloro, and wherein R' and R'' are alkyl defined as above, or together

is pyrrolidino, piperidino, or morpholino.

The most desirable compounds of formula II have the specific formula IIB:

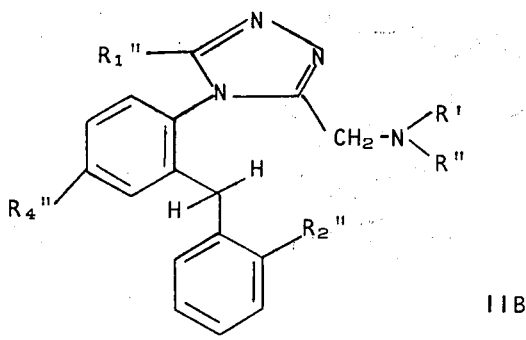

wherein R₁'' is alkyl of 1 to 3 carbon atoms, inclusive; and wherein R₂'' and R₄'' are hydrogen or chlorine, and wherein R' and R'' are alkyl defined as above, or together

is pyrrolidino, piperidino, or morpholino.

The process of this invention comprises: treating a compound of formula I or III with formaldehyde and a secondary amine

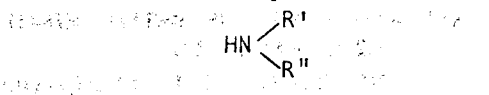

in which R' and R'' are defined as hereinabove, usually in an organic solvent e.g. at 75° C. to the reflux temperature, to give the novel compounds II from I or the known compounds IV from III. Compound II can be oxidized to give IV.

DESCRIPTION OF THE PREFERRED EMBODIMENT

Lower alkyl groups of 1 to 3 carbon atoms, inclusive, are exemplified by methyl, ethyl, propyl, and isopropyl.

The cycloalkyl group of 3 to 8 carbon atoms, inclusive, is exemplified by cyclopropyl, cyclobutyl, cyclopentyl, cyclohexyl, cycloheptyl, and cyclooctyl.

The novel compounds of the formulae II including acid addition salts thereof have sedative, tranquilizing, hypnotic, muscle relaxant and anticonvulsant effects in mammals including man and birds. They are also useful as feed additives for increasing growth rate and feed efficiency of livestock and poultry, milk production during lactation in the mammalian species and egg production in the avian species.

The acid addition salts of compounds of formula II contemplated in this invention, are the hydrochlorides, hydrobromides, hydriodides, sulfates, phosphates, fumarates cyclohexanesulfamates, methanesulfonates and the like, prepared by reacting a compound of formula II with an excess of the selected pharmacologically acceptable acid.

Sedative effects of 4-[4-chloro-α-phenyl-o-tolyl]-5-pyrrolidinomethyl-3-methyl-4H-1,2,4-triazole are shown by the following tests in mice:

Chimney test: [Med. Exp. 4, 145 (1961)]: The effective intraperitoneal dosage for 50% of the mice (ED₅₀) is 79 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. ED₅₀ equals the dose of the test compound at which 50% of the mice remain in the dish. The ED₅₀ (intraperitoneal administration) in this test is 40 mg./kg.

Pedestal test: The untreated mouse leaves the pedestal in less than a minute to climb back to the floor of the standard mouse box. Tranquilized mice will stay on the pedestal for more than 1 minute. The ED₅₀ (intraperitoneal administration) is 79 mg./kg.

Nicotine antagonism test: Mice in a group of 6 are injected with the test compound[4-[4-chloro-α-phenyl-o-tolyl]-5-pyrrolidinomethyl-3-methyl-4H-1,2,4-triazole). Thirty minutes later the mice, including control (untreated) mice, are injected with nicotine salicylate (2 mg./kg.). The control mice show overstimulation, i.e., (1) running convulsions followed by (2) tonic extensor fits followed by (3) death. An intraperitoneal dosage of 36 mg./kg. of the test compound protected 50% of the mice against (2) and (3) (ED₅₀).

The above novel triazoles of formula II are also important as intermediates to produce the known triazolobenzophenone compounds of formula IV which are even more active tranquilizing compounds. For example, 5-chloro-2-[3-methyl-5-(pyrrolidinomethyl)-1,2,4-triazol-4-yl]benzophenone has $ED_{50}$ as follows Dish test 1.3 mg./kg.
Pedestal 2.3 mg./kg.
Nicotine antagonism test (2) and (3) 0.4 mg./kg.

For the following benzophenones IV, these values were found:

|  | Ch | D | Ni |
|---|---|---|---|
| 5-chloro-2-[3-methyl-5-dimethylamino-methyl-4H-1,2,4-triazol-4-yl]benzophenone | 1.8 | 2.2 | 0.56 |
| 5-chloro-2-[3-methyl-5-diethylamino-methyl]-4H-1,2,4-triazol-4-yl]benzophenone | 0.6 | 1.0 | 0.22 |
| 5-chloro-2-[3-methyl-5-(pyrrolidino-methyl)-4H-1,2,4-triazol-4-yl]benzophenone | 0.7 | 1.3 | 0.4 |
| 5-chloro-2-[3-methyl-5-(morpholinomethyl)-54H-1,2,4-triazol-4-yl]benzophenone | 1.0 | 1.8 | 0.5 |
| 5-chloro-2-[3-methyl-5-(piperidinomethyl)-4H-1,2,4-triazol-4-yl]benzophenone hydrochloride | 1.4 | 2.8 | 0.8 |
|  | Ch | D | Ni |

Ch = Chimney test
D = dish test
P = pedestal test
Ni = nicotine antagonism (3) test The pharmaceutical forms contemplated by this invention include pharmaceutical compositions suited for oral, parenteral and rectal use, e.g., tablets, powder packets, cachets, dragees, capsules, solutions, suspensions, sterile injectable form, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes, and starch, oatmeal, dried fishmeat, fishmeal, flour and the like can be prepared.

As tranquilizers, the compounds of formula II can be used in dosages of 1–50 mg./kg. preferably 5 to 25 mg./kg. in oral or injectable preparations as described above, to alleviate tension. For compounds of formula IV the dosage can be much smaller, for example 0.1 to 2.0 mg./kg. As feed additives the compounds of formula II can be used in dosages of 0.003 mg. to 50 mg./animal/day in a feed to increase growth, feed consumption and feed efficiency in livestock and poultry, milk production in the mammalian species and egg production in the avian species.

The starting compounds I and III in this invention are obtained as shown in the Preparation.

In carrying out the Process of this invention the starting compound of structures I or III, in an organic solvent such as diglyme, are heated together with formaldehyde, paraformaldehyde and water, or formalin, and a secondary amine or a secondary amine hydrochloride with additional hydrochloric acid. The heating is carried out preferably between 75° C. and the reflux temperature of the mixture, about 162° C. for diglyme. Instead of diglyme, other solvents such as ethanol, n-propanol, n-butanol, tetrahydrofuran, mono-or triglyme can be used with monoglyme and diglyme preferred. The secondary amine is used in excess, preferably from 1.2 to 4 times the stoichiometric requirement. In the preferred embodiment of this invention the formaldehyde, paraformaldehyde or formalin is used in excess of 2 to 10 times the stoichiometrically required amount and the hydrochloric acid in an excess of 1.2 to 4 times the required amount. The reaction period is between 6 and 48 hours. After the reaction is terminated, the mixture is quenched in a basic solution of sodium or potassium hydroxide or carbonate and the product (II or IV) recovered and purified by conventional procedures such as extraction, trituration, chromatography, crystallization, combinations thereof and the like.

The products of formula II can be oxidized to give the corresponding benzophenones IV e.g. with chromic anhydride, in sulfuric acid (Jones reagent), as shown in Preparations.

The Mannich reaction at $C_3$(or $C_5$) of a 1,2,4-triazole compound is new.

Although Bachman and Hersey [J. Amer. Chem. Soc., 68, 2497 (1946)] demonstrated that benzotriazoles (1,2,3) reacted at nitrogen in a Mannich synthesis to give unstable Mannich base products (such as A).

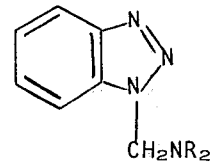

A the literature records no example of a successful Mannich reaction performed at either carbon position 3 or 5 of a 1,2,4-triazole. [The reaction of 4-benzyl-1,2,4-triazole with formaldehyde in a bomb at high temperature and pressure has been reported by Jones and Ainsworth, J. Amer. Chem. Soc., 77, 1538 (1955). The resulting alcohol must then be converted to a halide or methanesulfonyl derivative before it can be treated with an amine to afford the Mannich base]. The Mannich reaction is performed under conditions of slightly acid pH so that the active electrophile, the iminium salt B, $$CH_2=N^+R_2X^-  \qquad B$$

can be generated from formaldehyde and an amine. The "intermediate iminium salt is a sufficiently reactive electrophilic agent to attack such relatively reactive aromatic nuclei as phenol and indole". (See House, "Modern Synthetic Reactions" 2nd Edition, Benjamin, Menlo Park, 1972). Presumably, other reactive aromatic nuclei may be attacked as well. The triazole ring, however, is sufficiently basic to be protonated under the acidic conditions of the Mannich reaction [(see, for example the X-ray results reported by Hester, Duchamp, and Chidester, Tet. Lett. 1609, (1972)] and such protonation will decrease its reactivity toward electrophilic reagents. Therefore, a successful Mannich reaction on a triazole ring substrate requires a delicate balance of acid and basic reagents, such as are presently reported. Only the products of nuclear attack, such as II and IV, were formed and were not contaminated with any side products such as

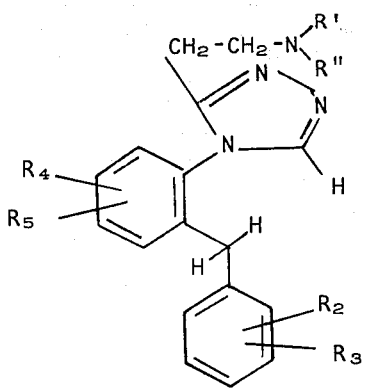

The following preparations and examples are illustrative of the processes and products of the present invention, but are not to be construed as limiting.

The 2-aminobenzophenones used in these preparations are known in the art and are well described including their synthesis in:

J. Org. Chem. 26 4491 (1961);
  ibid. 27 3781 (1962);
  ibid. 30 521 (1965);
  ibid. 32 3798 (1967);

Helv. Chim. Acta. 45, 2226 (1962); U.S. Pat. 3,121,075.

Preparation 1 2-amino-5-chlorobenzophenone hydrazone

A mixture of 27.2 g. (0.117 mol.) of 2-amino-5-chlorobenzophenone, in 170 ml. of diethylene glycol, and 23 ml. (0.45 mol.) of 99% hydrazine hydrate is refluxed for 7 hours. The solution is allowd to cool overnight to room temperature. The light green-colored solid which resulted is mixed with 400 ml. of water and extracted into benzene; the layers are separated and the benzene portion dried over anhydrous magnesium sulfate and concentrated. Crystallization of the residue from ether/hexane affords 13.5 g. (46.8%) of white fluffy needles of 2-amino-5-chlorobenzophenone hydrazone of melting point 133°–133.5° C.

Anal. calcd. for $C_{13}H_{12}ClN_3$:
  C, 63.55; H, 4.93; N, 17.11; Cl, 14.43.
  Found: C, 63.58; H, 4.95; N, 17.32; Cl, 14.39.

A second crop (6.0 g., 21%) of needles has a melting point of 132°–134° C.

Preparation 2 2-amino-2',5-dichlorobenzophenone hydrazone

In the manner given in Preparation 1, 2-amino-2',5-dichlorobenzophenone is refluxed with hydrazine hydrate in diethylene glycol to give 2-amino-2',5-dichlorobenzophenone hydrazone, as an oil.

Preparation 3 2-amino-5-chloro-2',6'-difluorobenzophenone hydrazone

In the manner given in Preparation 1, 2-amino-5-chloro-2',6'-difluorobenzophenone is refluxed with hydrazine hydrate in diethylene glycol to give 2-amino-5-chloro-2',6'-difluorobenzophenone hydrazone.

Preparation 4 2-amino-2'-chloro-5-nitrobenzophenone hydrazone

In the manner given in Preparation 1, 2-amino-2'-chloro-5-nitrobenzophenone is refluxed with hydrazine hydrate in diethylene glycol to give 2-amino-2'-chloro-5-nitrobenzophenone hydrazone.

Preparation 5 2-aminobenzophenone hydrazone

In the manner given in Preparation 1, 2-aminobenzophenone is refluxed with hydrazine hydrate in diethylene glycol to give 2-aminobenzophenone hydrazone.

Preparation 6 2-benzyl-4-chloroaniline

Potassium hydroxide pellets (16.1 g. 245 mmol) are ground and dissolved in 85 ml. of refluxing diethylene glycol. Volatile materials are distilled until the temperature of the liquid reaches 200° C. The solution is then cooled to room temperature and 13.5 g. (54.6 mmol) of 2-amino-5-chlorobenzophenone hydrazone is added while the syrupy liquid is gently reheated. At 100° C. all the hydrazine has dissolved. The temperature is maintained between 120°–150° C. for 45 minutes until gas evolution ceases. After a total heating period of 1.5 hour, the solution is cooled, poured onto ice and extracted with benzene. The benzene layer is separated, dried over anhydrous magnesium sulfate and concentrated to yield an orange oil. Distillation affords 9.9 g. of 2-benzyl-4-chloroaniline (89.2%) as a yellow oil of boiling point 125°–140° C. (at 0.1 mm Hg).

Anal. calcd. for $C_{13}H_{12}ClN$:
  C, 71.72; H, 5.56; N, 6.44; Cl, 16.28.
  Found: C, 71.55; H, 5.51; N, 6.58; Cl, 16.16.

Preparation 7 2-(o-chlorobenzyl)-4-chloroaniline

In the manner given in Preparation 6, 2-amino-2',5-dichlorobenzophenone hydrazone is refluxed with potassium hydroxide in diethylene glycol to give 2-(o-chlorobenzyl)-4-chloroaniline of melting point 64°–65° C.

Preparation 8 4-chloro-α-(2,6-difluorophenyl)-o-toluidine

In the manner given in Preparation 6, 2-amino-5-chloro-2',6'-difluorobenzophenone hydrazone is refluxed with potassium hydroxide in diethylene glycol to give 4-chloro-α-(2,6-difluorophenyl)-o-toluidene.

Preparation 9 2-(o-Chlorobenzyl)-4-nitroaniline

In the manner given in Preparation 6, 2-amino-2'-chloro-5-nitrobenzophenone hydrazone is refluxed with potassium hydroxide in diethylene glycol to give 2-(o-chlorobenzyl)-4-nitroaniline.

Preparation 10 2-benzylaniline

In the manner given in Preparation 6, 2-aminobenzophenone hydrazone is refluxed with potassium hydroxide in diethylene glycol to give 2-benzylaniline of melting point 51°–52° C.

Preparation 11 1-acetyl-2-[N-(4-chloro-α-phenyl-o-tolyl)-formimidoyl]hydrazine

A mixture of 3.37 g. (15.5 mmol) of 2-benzyl-4-chloroaniline, 5.52 g. (37.3 mmol) of triethylorthoformate and a catalytic amount of the starting amine hydrochloride is refluxed 5 hours to distill off ethanol. The orange solution is permitted to cool to room temperature. This crude oil is then dissolved in 25 ml. of absolute ethanol and 2.35 g. (32.0 mmol) of acethydrazide is added. After stirring the solution for 0.5 hours, a white solid precipitates. Stirring is continued for an additional 2.5 hours and the solid is dissolved in ethyl acetate and recrystallized from ethyl acetate/hexane to give 2.95 g. (61%) of white fine needles of 1-acetyl-2-[N-(4-chloro-α-phenyl-o-tolyl)formimidoyl]hydrazine of melting point 170.5°–173° C. The analytical sample has a melting point at 174°–175° C.:

Anal. calcd. for $C_{16}H_{16}ClN_3O$:
C, 63.68; H, 5.35; N, 13.93; Cl, 11.74.
Found: C, 63.81; H, 5.22; N, 13.94; Cl, 11.57.

A second crop (0.8 g. 17%) has a melting point 157°–160° C.

Preparation 12  1-isonicotinoyl-2-[N-(4-chloro-α-phenyl-o-tolyl)formimidoyl)]hydrazine A mixture of 10.12 g. (46.5 mmol) of 2-benzyl-4-chloroaniline and 16.57 g. (101.9 mmol) of triethylorthoformate is refluxed in a 50 ml. round bottom flask to distill off ethanol. After an additional 2–4 hour heating period, the liquid in the flask is permitted to cool to room temperature and the resulting reaction mixture dissolved in 100 ml. of absolute ethanol. To this solution is added 13.2 g. (96 mmol) of isoniazid. The mixture (isoniazid is not very soluble in cold ethanol) is stirred at room temperature overnight. The solid is filtered and dissolved in 700 ml. of tetrahydrofuran and concentrated to a volume of 350 ml. Hexane is cautiously added until the solution just becomes cloudy. A white solid (5.3 g. 31%) is collected, melting point 173°–178° C. Recrystallization of a small sample from tetrahydrofuran increases the melting point to 180°–182° C. A sample crystallized from dimethylformamide-water has a melting point of 193°–194° C.

The mother liquors from the first crystallization yield 3.67 g. (22%) of white powder of melting point 178°–182° C. The analytical sample of 1-isonicotinoyl-2-[N-(4-chloro-α-phenyl-o-tolyl(formimidoyl]hydrazine has a melting point of 180°–182° C.

Preparation 13  1-acetyl-2-[N-[4-chloro-α-(o-chlorophenyl)-o-tolyl]formimidoyl]hydrazine In the manner given in Preparation 11, 2-(o-chlorobenzyl)-4-chloroaniline and triethylorthoformate is refluxed, then after 4 hours heating, treated, at room temperature, with acetylhydrazide to give 1-acetyl-2-[N-[4-chloro-α-(o-chlorophenyl)-o-tolyl]formimidoyl]hydrazine; yield 93%; melting point 196.5°–199.5° C.

Anal. calcd. for $C_{16}H_{15}Cl_2N_3O$:
C, 57.15; H, 4.50; N, 12.50; Cl, 21.09.
Found: C, 57.06; H, 4.41; N, 12.26; Cl, 21.21.

Preparation 14  1-propionyl-2-[N-[4-chloro-α-(2,6-diflourophenyl)-o-tolyl]formimidoyl]hydrazine In the manner given in Preparation 11, 4-chloro-α-(2,6-difluorophenyl)-o-toluidine and triethylorthoformate is refluxed, then after 5 hours, treated at room temperature with propionic acid hydrazide to give 1-propionyl-2-[N-[4-chloro-α(2,6-difluorophenyl)-o-tolyl]formimidoyl]-hydrazine.

Preparation 15  1-cyclopropylcarbonyl-2-[N-[α-(o-chlorophenyl)-4-nitro-o-tolyl]formimidoyl]hydrazine In the manner given in Preparation 11, 2-(o-chlorobenzyl)-4-nitroaniline and triethylorthoformate is refluxed, then, after 5 hours, treated, at room temperature with cyclopropylcarbonyl hydrazide to give 1-cyclopropylcarbonyl-2-[N-[α-(o-chlorophenyl)-4-nitro-o-tolyl]formimidoyl]-hydrazine.

Preparation 16  1-benzoyl-2-[N-(α-phenyl-o-tolyl)formimidoyl]hydrazine

In the manner given in Preparation 11, 2-benzylaniline and triethyl orthoformate is refluxed, then after 5 hours, treated, at room temperature, with benzoylhydrazide to give 1-benzoyl-2-[N-(α-phenyl-o-tolyl)formimidoyl]hydrazine.

Preparation 17  4-[4-chloro-α-(phenyl)-o-tolyl]-3-methyl-4H-1,2,4-triazole

To a one liter flask is added 28.4 g. (94.2 mmol) of 1-acetyl-2-[N-[4-chloro-α-(phenyl)-o-tolyl]formimidoyl]-hydrazone and 400 ml. of diglyme. The mixture is heated to reflux and at 120° all the solid starting material dissolves. Pyridine (20 ml.) is added and the solution is refluxed overnight (20 hours). About 200 ml. of pyridine, water and diglyme are removed by distillation under reduced pressure and to the remaining cold reaction solution is added 1,500 ml. of (reagent grade) hexane. Trituration in an ice bath yields 20.8 g. (78%) of 4-[4-chloro-α-(phenyl)-o-tolyl]-3-methyl-4H-1,2,4-triazole of melting point 135°–139° C. An analytical sample is obtained on recrystallization from ethyl acetate/hexane having a melting point of 142° C.

Anal. calcd. for $C_{16}H_{14}ClN_3$:
C, 67.72; H, 4.97; N, 14.81; Cl, 12.50.
Found: C, 67.99; H, 4.98; N, 14.99; Cl, 12.61.

Preparation 18  4-[4-chloro-α-(phenyl)-o-tolyl]-3-(4-pyridyl)-4H-1,2,4-triazole

1-Isonicotinoyl-2-[N-(4-chloro-α-phenyl-o-tolyl)formimidoyl]hydrazine (3.64 g., 10.0 mmol) is placed in a 200 ml. round bottom flask with 60 ml. of diglyme. The mixture is refluxed. At a pot temperature of approximately 150° C., all the starting material is dissolved. Refluxing is continued an additional 3 hours and the solution is permitted to cool overnight. The slightly cloudy liquid is dried with anhydrous magnesium sulfate sodium sulfate and filtered. Hexane is added (900 ml.) and the solution is placed in a refrigerator after scratching to induce crystallization. The light brown solid is filtered to yield 2.33 g. (67%) of 4-[4-chloro-α-(phenyl)-o-tolyl]-3-(4-pyridyl)-4H-1,2,4-triazole with a melting point of 138°–142° C. An analytical sample is prepared most conveniently by recrystallization first from aqueous methanol to give plates having a melting point 145°–146°C. followed by recrystallization from ethyl acetate/hexane to yield white prisms of melting point 145°–146.5° C.

Anal. calcd. for $C_{20}H_{15}Cl_4$:
C, 69.26; H, 4.36; N, 16.16; Cl, 10.22.
Found: C, 69.32; H, 4.64; N, 16.15; Cl, 10.28.

Preparation 19  4-[4-chloro-α-(o-chlorophenyl)-o-tolyl]-3-methyl-4H-1,2,4-triazole In the manner given in Preparation 17, 1-acetyl-2-[N-[4-chloro-α-(o-chlorophenyl)-o-tolyl]formimidoyl]hydrazine is heated with diglyme and pyridine to give in 66% yield 4-[4-chloro-α-(o-chlorophenyl)-o-tolyl]-3-methyl-4H-1,2,4-triazole of melting point 159°–161° C.

Anal. calcd. for $C_{16}H_{13}Cl_2N_3$:
    C, 60.39; H, 4.12; N, 13.21; Cl, 22.28.
    Found: C, 60.13; H, 4.02; N, 13.34; Cl, 22.52.

Preparation 20 4-[4-chloro-α-(2,6-difluorophenyl)-o-tolyl]-3-ethyl-4H-1,2,4-triazole In the manner given in preparation 17, 1-propionyl-2-[N-[4-chloro-α-(2,6-difluorophenyl)-o-tolyl]formimidoyl]-hydrazine is heated with diglyme and pyridine to give 4-[4-chloro-α-(2,6-difluorophenyl)-o-tolyl]-3-ethyl-4H-1,2,4-triazole.

Preparation 21 4-[α-(o-chlorophenyl)-4-chloro-o-tolyl]-3-cyclopropyl-4H-1,2,4-triazole In the manner given in Preparation 17, 1-cyclopropylcarbonyl-2-[N-[α-(o-chlorophenyl)-4-chloro-o-tolyl]-formimidoyl]-hydrazine is heated with diglyme and pyridine to give 4-[α-(o-chlorophenyl)-4-chloro-o-tolyl]-3-cyclopropyl-4H-1,2,4-triazole.

Preparation 22 4-[α-(phenyl)-o-tolyl-3-phenyl-4H-1,2,4-triazole

In the manner given in Preparation 17, 1-benzoyl-2-[N-(α-phenyl-o-tolyl)formimidoyl]hydrazine is heated with diglyme and pyridine to give 4-[α-(phenyl)-o-tolyl]-3-phenyl-4H-1,2,4-triazole.

Preparation 23 5-chloro-2-(3-methyl-4H-1,2,4-trizol-4-yl)-benzophenone

Jones' Reagent (0.5 ml.), was added to a solution of 4-[4-chloro-α-(phenyl)-o-tolyl]-3-methyl-4H-1,2,4-triazole (0.285 g., 1.00 mmol.) in 1 ml. of glacial acetic acid. The solution was stirred for 2 hours at room temperature and 4 hours at reflux (steam bath). An additional 0.5 ml. of Jones' Reagent was added and the solution was refluxed for 1 more hour. The reaction mixture was poured into 50 ml. of 5% aqueous sodium hydroxide and extracted with chloroform. The chloroform extract was dried over anhydrous magnesium sulfate and concentrated on a rotary evaporator (Rota Vap) to leave a yellow solid. Crystallization from ethyl acetate/hexane afforded 180 mg. (61%) of 5-chloro-2-(3-methyl-4H-1,2,4-triazol-4-yl)benzophenone as white prisms of melting point 164°–166° C. Recrystallization changed the melting point to 167.5°–169° C. identical to that of an authentic sample.

Preparation 24 2′,5-dichloro-2-(3-methyl-4H-1,2,4-triazol-4-yl)benzophenone

In a 10 ml. flask, 315 mg. (0.99 mmol.) of 4-[4-chloro-α-(o-chlorophenyl)-o-tolyl]-3-methyl-4H-1,2,4-triazole was dissolved in 1.0 ml. of acetic acid and 1.0 ml. of Jones' reagent. The mixture was refluxed for two hours and worked up by quenching in 40 ml. of 7% aqueous sodium hydroxide and extracting with chloroform. The organic layer was dried and crystallized from ethyl acetate:hexane (1:2) to give 170 mg. of 2′,5-dichloro-2-(3-methyl-4H-1,2,4-triazol-4-yl)benzophenone as prisms of melting point 147.5°–148.5° C.

Anal. calcd. for $C_{16}H_{11}ClN_{23}O$:
    C, 57.85; H, 3.34; N, 12.65; Cl, 21.35.
    Found: C, 57.70; H, 3.21; N, 12.47; Cl, 21.58.

Preparation 25 5-chloro-2′,6′-difluoro-2-(3-ethyl-4H-1,2,4-trizol-4-yl)benzophenone In the manner given in Preparation 23, 4-[4-chloro-α-(2,6-difluorophenyl)-o-tolyl]-3-ethyl-4H-1,2,4-triazole was oxidized with Jones' reagent to give 5-chloro-2′,6′-difluoro-2-(3-ethyl-4H-1,2,4-triazol-4-yl)benzophenone.

Preparation 26 5-chloro-2-[3-(4-pyridyl)-4H-1,2,4-triazol-4-yl]benzophenone

Jones' reagent (1.5 ml.) is added to a solution of 4-[4-chloro-α-(phenyl)-o-tolyl]-3-(4-pyridyl)-4H-1,2,4-triazole (0.696 g., 2.00 mmol.) in 2 ml. of glacial acetic acid. The mixture is refluxed gently on a steam bath. After 1.5 hours of reflux, the solution has become dark green in color. A small portion is removed and quenched in 5% sodium hydroxide and extracted with chloroform, dried over anhydrous magnesium sulfate, and concentrated and analyzed by thin layer chromatography. An additional 1.5 ml. of Jones' reagent is added and the refluxing continued for another 3.5 hours. The reaction is permitted to cool to room temperature overnight and worked up as described above to give 400 mg. of slightly brown solid. Recrystallization from chloroform-hexane affords 380 mg. of 5-chloro-2-[3-(4-pyridyl)-4H-1,2,4-triazol-4-yl]benzophenone as fine white needles of melting point 250°–251° C. The analytical sample (recrystallized from chloroform/methanol) has a melting point 251°–251.5° C.

Anal. calcd. for $C_{20}H_{13}ClN_4O$:
    C, 66.58; H, 3.63; N, 15.53; Cl, 9.83.
    Found: C, 66.45; H, 3.65; N, 15.36; Cl, 9.88.

Preparation 27 2′,5-dichloro-2-(3-cyclopropyl-4H-1,2,4-triazol-4-yl)benzophenone In the manner given on preparation 23 4-[α-4-chloro-α-(o-chlorophenyl)-o-tolyl]-3-cyclopropyl-4H-1,2,4-triazole was oxidized with Jones' reagent to give 2′,5-dichloro-2-(3-cyclopropyl-4H-1,2,4-triazol-4-yl)benzophenone.

In the manner given in the preceding preparations other 2-(3-substituted-4H-1,2,4-triazol-4-yl)benzophenones compounds can be produced from the corresponding 2-amino-benzophenones. Representative compounds, thus obtained include: 3′,5-dibromo-2-(3-propyl-4H-1,2,4-triazol-4-yl)benzophenone;
2′-bromo-6-fluoro-2-(3-cyclobutyl-4H-1,2,4-triazol-4-yl)-benzophenone;
2′-fluoro-4-ethyl-2-(3-cyclopentyl-4H-1,2,4-triazol-4-yl)-benzophenone;
4′-diisopropyl-2-(3-cyclohexyl-4H-1,2,4-triazol-4-yl)-benzophenone;
3-ethyl-2-[3-(3-pyridyl)-4H-1,2,4-triazol-4-yl]-benzophenone;
4-bromo-5-chloro-2-(3-cyclooctyl-4H-1,2,4-triazol-4-yl)-benzophenone;
4-fluoro-2-[3-(2-pyridyl)-4H-1,2,4-triazol-4-yl]-benzophenone;
2′,4′-difluoro-4-isopropyl-2-[3-(3-pyridyl)-4H-1,2,4-triazol-4-yl]-benzophenone;
4,6-difluoro-2-(3-isopropyl-4H-1,2,4-triazol-4-yl)benzophenone;
2′,6′,4,5-tetraethyl-2-[3-cyclopropyl-4H-1,2,4-triazol-4-yl)benzophenone;
2′,5-dichloro-2-[3-(4-pyridyl)-4H-1,2,4-triazol-4-yl]benzophenone;
5-propyl-3′-trifluoromethyl-2-(3-ethyl-4H-1,2,4-triazol-4-yl)benzophenone;

5-methyl-2'-trifluoromethyl-2-(3-methyl-4H-1,2,4-triazol-4-yl)benzophenone;
3-propyl-2',4'-diethyl-2-(3-propyl-4H-1,2,4-triazol-4-yl)-benzophenone;
5-fluoro-2'-chloro-(3-methyl-4H-1,2,4-triazol-4-yl)benzophenone
and the like.

The benzophenones IV described in Examples 25 to 27 can be converted to the corresponding triazolobenzodiazepines:

EXAMPLE 1

4-[4-chloro-α-phenyl-o-tolyl]-5-pyrrolidinomethyl-3-methyl-4H-1,2,4-triazole

A mixture of 0.60 ml. of 37% formalin (0.22 g., 7.4 mmol), 0.250 ml. of pyrrolidine (boiling point 85°) (0.213 g., 3.0 mmol) and 1.00 ml. of 2.0N hydrochloric acid is dissolved in 2.0 ml. of diglyme in a 20 ml. flask fitted with a reflux condenser and magnetic stirrer bar. Solid 5-chloro-[4-chloro-α-phenyl-o-tolyl]-3-methyl-4H-1,2,4-triazole (0.2835 g., 1.00 mmol) is added, and the mixture is refluxed for 16 hours on a steam bath. The reaction mixture is quenched by cooling and pouring it into an aqueous 5% sodium hydroxide solution and extracting with benzene. The benzene layer is dried over anhydrous magnesium sulfate, concentrated and diluted with hot ethyl acetate and hexane. On cooling 0.208 g. (56.7%) of colorless prisms are obtained, melting point 138°–142° (decomp). Recrystallization from ethyl acetate/hexane affords 0.156 g. of 4-[4-chloro-α-phenyl-o-tolyl]-5-pyrrolidino-methyl-3-methyl-4H-1,2,4-triazole of melting point 141°–144° C.

Anal. calcd. for $C_{21}H_{23}ClN_4$:
C, 68.74; H, 6.32; N, 15.28; Cl, 9.66.
Found: C, 68.60; H, 6.30; N, 14.95; Cl, 9.64.

EXAMPLE 2

4-[4-chloro-α-(o-chlorophenyl)-o-tolyl]-5-piperidinomethyl-3-ethyl-4H-1,2,4-triazole In the manner given in Example 1, 4-[4-chloro-α-(o-chlorophenyl)-o-tolyl]-3-ethyl-4H-1,2,4-triazole, dissolved in diglyme, is heated to reflux with formalin, piperidine and 2N hydrochloric acid at 100° C. to give 4-[4-chloro-α-(o-chlorophenyl)-o-tolyl]-5-piperidinomethyl-3-ethyl-4H-1,2,4-triazole.

EXAMPLE 3

4-[4-chloro-α-(o-chlorophenyl)-o-tolyl]-5-pyrrolidinomethyl-3-methyl-4H-1,2,4-triazole In the manner given in Example 1, 4-[4-chloro-α-(o-chlorophenyl)-0-tolyl]-3-methyl-4H-1,2,4-triazole, dissolved in diglyme is heated to reflux with formalin, pyrrolidine and 2N hydrochloric acid at 100° C. to give 4-[4-chloro-α-(chlorophenyl)-o-tolyl]-5-pyrrolidinomethyl-3-methyl-4H-1,2,4-triazole of melting point 140°–149° C.

Anal. calcd. for $C_{21}H_{22}Cl_2N_4$:
C, 62.85; H, 5.53; N, 13.96; Cl, 17.67.
Found: C, 62.64; H, 5.56; N, 14.05; Cl, 17.65.

EXAMPLE 4

4-[4-chloro-α-(o-chlorophenyl)-o-tolyl]-5-dimethylaminomethyl-3-(methyl)-4H-1,2,4-triazole In the manner given in Example 1, 4-[4-chloro-α-(o-chlorophenyl)-o-tolyl]-3-(methyl)-4H-1,2,4-triazole, dissolved in diglyme, is heated to reflux with formalin, dimethylamine and 2N hydrochloric acid at 100° C. to give 4-[4-chloro-α-(o-chlorophenyl)]-o-tolyl]-5-dimethylaminomethyl-3-(methyl)-4H-1,2,4-triazole.

EXAMPLE 5

4-[4-chloro-α-(o-chlorophenyl)-o-tolyl]-5-morpholinomethyl-3-ethyl-4H-1,2,4-triazole In the manner given in Example 1, 4-[4-chloro-α-(chlorophenyl)-o-tolyl]-3-cyclopropyl-4H-1,2,4-triazole, dissolved in diglyme, is heated to reflux with formalin, morpholine and 2N hydrochloric acid at 100° C. to give 4-[4-chloro-α-(o-chlorophenyl)-o-tolyl]-5-morpholinomethyl-3-cyclopropyl-4H-1,2,4-triazole.

EXAMPLE 6

4-[4-fluoro-α-(o-chlorophenyl)-o-tolyl]-5-diethylaminomethyl-4H-1,2,4-triazole

In the manner given in Example 1, 4-[4-fluoro-α-(o-chlorophenyl)-o-tolyl]-4H-1,2,4-triazole dissolved in diglyme, is heated to reflux with formalin, diethylamine and 2N hydrochloric acid at 100° C. to give 4-[4-fluoro-α-(o-chlorophenyl)-o-tolyl]-5-diethylamine methyl-4H-1,2,4-triazole.

EXAMPLE 7

4-[α-phenyl-o-tolyl]-5-dipropylaminomethyl-3-phenyl-4H-1,2,4-triazole

In the manner given in Example 1, 4-[α-phenyl-o-tolyl]-3-phenyl-4H-1,2,4-triazole, dissolved in diglyme, is heated to reflux with formalin, dipropylamine and 2N hydrochloric acid at 100° C. to give 4-[α-phenyl-o-tolyl]-5-dipropylaminomethyl-3-phenyl-4H-1,2,4-triazole.

EXAMPLE 8

4-[5-bromo-α-(p-trifluoromethylphenyl)-o-tolyl]-5-dipropylaminomethyl-3-chloro-4H-1,2,4-triazole In the manner given in Example 1, 4-[5-bromo-α-(p-trifluoromethylphenyl)-o-tolyl]-3-chloro-4H-1,2,4-triazole, dissolved in diglyme, is heated to reflux with formalin, dipropylamine and 2N hydrochloric acid at 100° C. to give 4-[5-bromo-α-(p-trifluoromethylphenyl)-o-tolyl]-5-dipropylaminomethyl-3-chloro-4H-1,2,4-triazole.

EXAMPLE 9

4-[5-fluoro-α-(o-chlorophenyl)-o-tolyl]-5-piperidinomethyl-4H-1,2,4-triazole

In the manner given in Example 1, 4-[5-fluoro-(o-chloro)-o-tolyl]-4H-1,2,4-triazole, dissolved in diglyme, is heated to reflux with formalin, piperidine, and 2N hydrochloric acid at 100° C. to give 4-[5-fluoro-α-(o-chlorophenyl)-o-tolyl]-5-piperidinomethyl-4H-1,2,4-triazole.

EXAMPLE 10

5-chloro-2-[3-methyl-5-(pyrrolidinomethyl)-4H-1,2,4-triazol-4-yl]benzophenone

A solution of 3.0 ml. of 37% formalin (1.11 g. or 37.0 mmol), 1.25 ml. of distilled (85°) pyrrolidine (1.07 g., 15.0 mmol) and 7.50 ml. of 2N hydrochloric acid, in 10 ml. of diglyme is added to a 50 ml. flask, fitted with a reflux condenser and magnetic stirrer bar. 1.488 g. of 5-chloro-2-(3-methyl-4H-1,2,4-triazol-4-yl)benzophenone is added and the atmosphere above the reaction vessel is evacuated and replaced with nitrogen several times. The solution is refluxed under nitrogen for 17 hours. It is quenched by pouring into approximately 40 ml. of 5% aqueous sodium hydroxide and extracting with four 30 ml. portions of benzene. The benzene extracts are combined, dried over anhydrous magnesium sulfate and concentrated in a rotating evaporation vessel (rotavap). The resulting diglyme solution is heated on a steam bath, diluted with hexane and set aside to cool. In this way 1.04 g. of a white solid is collected. This powder is recrystallized from ethyl acetate/hexane to give 0.82 g. of white needles of 5-chloro-2-[3-methyl-5-(pyrrolidinomethyl)-4H-1,2,4-triazol-4-yl]benzophenone of melting point 169.5°–171.5° C.

Anal. calcd. for $C_{21}H_{21}ClN_4O$:
    C, 66.22; H, 5.56; N, 14.71; Cl, 9.31.
 Found: C, 66.00; H, 5.84; N, 14.44; Cl, 8.94.

EXAMPLE 11

5-chloro-2-[3-methyl-5-(pyrrolidinomethyl)-4H-1,2,4-triazol-4-yl]benzophenone.

A solution of Jones reagent (chromic anhydride-sulfuric acid) (1.0 ml.), is added to a solution of 0.380 g. of 4-[4-chloro-α-phenyl-o-tolyl]-5-pyrrolidinomethyl-3-methyl-4H-1,2,4-triazole dissolved in 1.0 ml. of acetic acid. The mixture is refluxed for 3 hours, cooled and quenched on 5% aqueous sodium hydroxide solution and extracted with chloroform. The chloroform layer is dried (magnesium sulfate) and concentrated. The residue is crystallized from ethyl acetate/hexane to give 5-chloro-2-[3-methyl-5-(pyrrolidinomethyl)-4H-1,2,4-triazol-4-yl]-benzophenone of melting point 169°–170° C.

EXAMPLE 12

5-chloro-2-[3-methyl-5-(morpholinomethyl)-4H-1,2,4-triazol-4-yl]benzophenone

A mixture of 3.0 ml. of 37% formalin (1.1 g., 37 mmol), 1.31 ml. of morpholine (1.31 g., 15.0 mmol) and 7.5 ml. of 2N hydrochloric acid, dissolved in 10 ml. of diglyme, is placed in a 50 ml. flask with magnetic stirrer bar and reflux condenser. The solid 5-chloro-2-[3-methyl-1,2,4-triazolo-4-yl]benzophenone (1.488 g., 5.00 mmol) is added in one portion, and the solution is refluxed for 24 hours. It is worked up by quenching in 5% aqueous sodium hydroxide extracting with benzene, drying the benzene extracts over magnesium sulfate and concentrating on a rotary evaporator. The resulting oil is subjected to column chromatography (silica Gel G, 10% methanol-chloroform as eluent). One hundred and fifty ml. fractions are collected. Fractions 20 and 21 contain the pure product. Fraction 22 contains primarily the product contaminated with an unknown material of lower Rf. Trituration of fractions 20 and 21 in ether separates the product from a gummy residue to give, after removal (under vacuum) in ether: 500 mg. of solid 5-chloro-2-[3-methyl-5-(morpholinomethyl)-4H-1,2,4-triazol-4-yl]benzophenone of melting point 128°–130° C. Recrystallization yields 350 mg. of large prisms of melting point 128.5°–130.5° C.

Anal. calcd. for $C_{21}H_{21}ClN_4O_2$:
    C, 63.56; H, 5.34; N, 14.12; Cl, 8.93.
 Found: C, 63.41; H, 5.37; N, 14.21; Cl, 9.08.

EXAMPLE 13

5-chloro-2',6'-difluoro-2-(3-methyl-5-dimethylaminomethyl-4H-1,2,4-triazol-4-yl)benzophenone In the manner given in Example 10, 5-chloro-2',6'-difluoro-2-(3-methyl-4H-1,2,4-triazol-4-yl)benzophenone, dimethylamino, formalin, diglyme, and hydrochloric acid are heated to reflux with stirring to give 4-chloro-2',6'-difluoro-2-[3-methyl-5-(dimethylaminomethyl)-4H-1,2,4-triazole-4-yl]benzophenone.

EXAMPLE 14

5-chloro-2-(3-methyl-5-diethylaminomethyl-4H-1,2,4-triazol-4-yl)benzophenone

In the manner given in Example 10, 5-chloro-2-[3-methyl-4H-1,2,4-triazol-4-yl]benzophenone, diethylamine, formalin, diglyme, and hydrochloric acid are heated to reflux with stirring to give 5-chloro-2-[3-methyl-5-diethylaminomethyl-4H-1,2,4-triazol-4-yl]benzophenone, melting point 109°–110° C.

Anal. calcd. for $C_{21}H_{23}ClN_4O$:
    C, 65.87; H, 6.05; N, 14.63; Cl, 9.26.
 Found: C, 65.86; H, 6.08; N, 14.73; Cl, 9.27.

EXAMPLE 15

6-chloro-5-propyl-3'-trifluoromethyl-2-[3-ethyl-5-dipropylaminomethyl-4H-1,2,4-triazol-4-yl]benzophenone In the manner given in Example 10, 6-chloro-5-propyl-3'-trifluoromethyl-2-[3-ethyl-4H-1,2,4-triazol-4-yl)benzophenone, dipropylamine, formalin, diglyme, and hydrochloric acid are heated to reflux with stirring to give 6-chloro-5-propyl-3'-trifluoromethyl-2-[3-ethyl-5-dipropyl-amino-methyl-4H-1,2,4-triazol-4-yl]benzophenone.

EXAMPLE 16

2',5-dichloro-2-[3-(dimethylamino)methyl-5-cyclopropyl-4H-1,2,4-triazol-4-yl]benzophenone In the manner given in Example 10, 2',5-dichloro-2-(3-cyclopropyl-4H-1,2,4-triazol-4-yl)benzophenone, dimethylamine hydrochloride, formalin and diglyme are heated to reflux with stirring to afford 2',5-dichloro-2-[3-(dimethylamino)methyl-5-cyclopropyl-4H-1,2,4-triazol-4-yl]benzophenone, melting point 109°–115° C.

Anal. calcd. for $C_{21}H_{20}Cl_2N_4O$:
    C, 60.73; H, 4.85; N, 13.49; Cl 17.07.
 Found: C, 60.64; H, 4.86; N, 13.61; Cl, 17.71.

EXAMPLE 17

5-bromo-4'-ethyl-2-(5-morpholinomethyl-4H-1,2,4-triazol-4-yl)benzophenone

In the manner given in Example 10, 5-bromo-4'-ethyl-2-[4H-1,2,4-triazol-4yl]benzophenone, morpholine, formalin, diglyme and hydrochloric acid are heated to reflux under stirring to give 5-bromo-4'-ethyl-2-[5-morpholinomethyl-4H-1,2,4-triazol-4-yl]-benzophenone.

EXAMPLE 18

5-methyl-2'-trifluoromethyl-2-[3-methyl-5-piperidinomethyl-4H-1,2,4-triazol-4-yl]benzophenone In the manner given in Example 10, 5-methyl-2'-trifluoromethyl-2-(3-methyl-4H-1,2,4-triazol-4-yl)benzophenone, piperidine, formalin, diglyme, and hydrochloric acid are heated to reflux under stirring to give 5-methyl-2'-trifluoromethyl-2-[3-methyl-5-piperidinomethyl-4H-1,2,4-triazol-4-yl]benzophenone.

EXAMPLE 19

2',5-dichloro-2-[3-(dimethylamino)methyl-5-methyl-4H-1,2,4-triazol-4-yl]benzophenone In the manner given in Example 10, 2',5-dichloro-2-(3-methyl-4H-1,2,4-triazol-4-yl)benzophenone, dimethylamine, formalin, diglyme, and hydrochloric acid are heated to reflux under stirring to give 2',5-dichloro-2-[3-(dimethylamino)methyl-5-methyl-4H-1,2,4-triazol-4-yl]-benzophenone.

EXAMPLE 20

5-chloro-2',6'-difluoro-2-[3-methyl-5-diethylaminomethyl-4H-1,2,4-triazol-4-yl]benzophenone In the manner given in Example 10, 5-chloro-2',6'-difluoro-2-[3-ethyl-4H-1,2,4-triazol-4-yl]benzophenone, diethylamine, formalin, diglyme and hydrochloric acid are heated to reflux under stirring to give 5-chloro-2',6'-difluoro-2-[3-ethyl-5-diethylaminomethyl-4H-1,2,4-triazol-4-yl]benzophenone.

EXAMPLE 21

5-fluoro-2'-chloro-2-[3-methyl-5-piperidinomethyl-4H-1,2,4-triazol-4-yl]benzophenone;

In the manner given in Example 10, 5-fluoro-2'-chloro-2-[3-methyl-4H-1,2,4-triazol-4-yl benzophenone, piperidine, formalin, diglyme, and hydrochloric acid are heated to reflux under stirring to give 5-fluoro-2'-chloro-2-[3-morpholino-5-piperidinomethyl-4H-1,2,4-triazol-4-yl]-benzophenone.

EXAMPLE 22

5-chloro-2-[3-methyl-5-(piperidinomethyl)-4H-1,2,4-triazol-4-yl]benzophenone hydrochloride In the manner given in Example 10, 5-chloro-2-(3-methyl-4H-1,2,4-triazol-4-yl)benzophenone, piperidine, formalin, diglyme and hydrochloric acid are heated to reflux with stirring under a nitrogen atmosphere to give 5-chloro-2-[3-methyl-5-(piperidinomethyl)-4H-1,2,4-triazol-4-yl]-benzophenone hydrochloride, fine needles of melting point 226°–245° (decomp.)

In the manner given in the before-going Examples other starting compounds of formulae I or III can be converted to compounds II (from I) and IV (from III). Representative compounds, thus obtained, include: 4-[5-trifluoromethyl-α-phenyl-o-tolyl]5-morpholinomethyl-3-ethyl-4H-1,2,4-triazole;
4-[4-propyl-6-methyl-α-(p-fluorophenyl)-o-tolyl]-5-piperidinomethyl-3-propyl-4H-1,2,4-triazole;
4-[4-fluoro-α-(phenyl)-o-tolyl]-5-pyrrolidinomethyl-3-(2-pyridyl)-4H-1,2,4-triazole;
4-(phenyl-o-tolyl)-5-piperidinomethyl-4H-1,2,4-triazole;
4-[α-(o-chlorophenyl)-o-tolyl]-5-pyrrolidinomethyl-4H-1,2,4-triazole;
4-[α-(o-chlorophenyl)-o-tolyl]-5-piperidinomethyl-3-methyl-4H-1,2,4-triazole;
4-[4,6-dimethyl-α-(o-chlorophenyl)-o-tolyl]-5morpholinomethyl-3-methyl-4H-1,2,4-triazole;
4-[5-chloro-α-phenyl-o-tolyl]-5-diethylaminomethyl-3-4H-1,2,4-triazole;

5-nitro-2-(3-cyclopropyl-5-dimethylaminomethyl-4H-1,2,4-triazol-4-yl)benzophenone;
2',5-difluoro-2-(3-methyl-5-piperidinomethyl-4H-1,2,4-triazol-4-yl)benzophenone;
5,4',6'-trichloro-2-[3-(cyclopropyl)-5-morpholinomethyl-4H-1,2,4-triazol-4-yl]benzophenone;
4,3',5',-trimethyl-2-[3-(4-pyridyl)-5-diethylaminomethyl-2H-1,2,4-triazol-4-yl]benzophenone; and the like.

These compounds above and of the prior examples can be converted to pharmacologically acceptable acid addition salts by reacting them with a selected pharmacologically acceptable acid such as hydrochloric, sulfuric, hydrobromic, acetic, lactic, tartaric, cyclohexanecarboxylic, cyclohexanesulfamic, citric acid, and the like.

I claim:

1. A 4-[α-phenyl-o-tolyl]-5-aminomethyl-3-substituted-4H-1,2,4-triazole of the formula II:

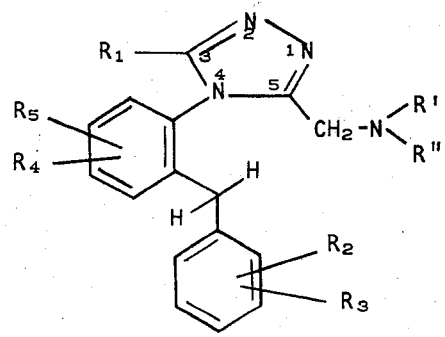

wherein $R_1$ is hydrogen, alkyl of 1 to 3 carbon atoms, inclusive, cycloalkyl of 3 to 8 carbon atoms, inclusive, phenyl, benzyl, or pyridyl, wherein R' and R'' are alkyl defined as above, or together

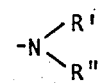

are pyrrolidino, piperidino, or morpholino; wherein $R_2$, $R_3$, $R_4$, and $R_5$ are hydrogen, alkyl as defined above, halogen, or trifluoromethyl.

2. A compound according to claim 1 of the formula IIA

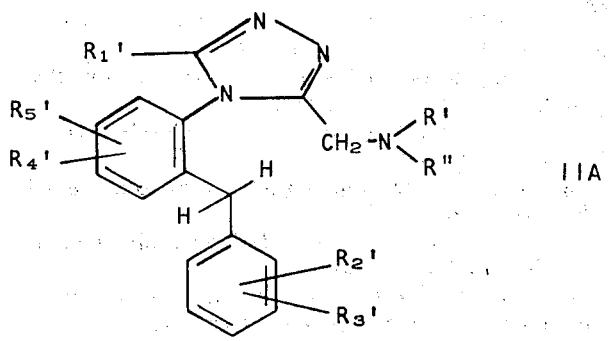

wherein $R_1'$ is alkyl of 1 to 3 carbon atoms or 4-pyridyl, inclusive; wherein $R_2'$, $R_3'$, $R_4'$ and $R_5'$ are hydrogen, fluoro, chloro and wherein R' and R" are alkyl defined as above, or together

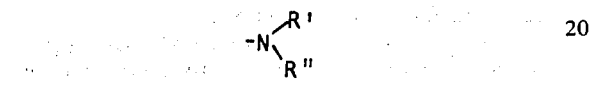

is pyrrolidino, piperidino, or morpholino.

3. A compound according to claim 1 of the formula IIB:

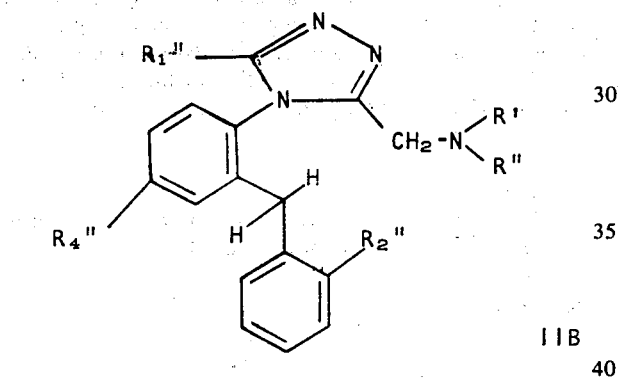

wherein $R_1''$ is alkyl of 1 to 3 carbon atoms, inclusive and wherein $R_2''$ and $R_4''$ are hydrogen or chlorine, and wherein R' and R" are alkyl defined as above, or together

is pyrrolidino, piperidino, or morpholino.

4. A compound according to claim 3 wherein $R_1''$ is methyl, the group

is pyrrolidino, $R_2''$ is hydrogen and $R_4''$ is chloro, and the compound is therefore 4-(4-chloro-1-α-phenyl-o-tolyl)-5-pyrrolidinomethyl-3-methyl-4H-1,2,4-triazole.

5. The compound according to claim 3 wherein $R_1''$ is methyl,

is pyrrolidino, and $R_2''$ and $R_4''$ are chloro and the compound is therefore 4-[4-chloro-α-(o-chlorophenyl)-o-tolyl]-5-pyrrolidinomethyl-3-methyl-4H-1,2,4-triazole.

* * * * *